(12) United States Patent
Hansmann et al.

(10) Patent No.: US 12,292,148 B2
(45) Date of Patent: May 6, 2025

(54) DEVICE FOR INFLUENCING, IN PARTICULAR REDUCING, VIBRATIONS IN A FLUID SYSTEM, AND METHOD FOR INFLUENCING, IN PARTICULAR REDUCING, VIBRATIONS IN A FLUID SYSTEM

(71) Applicant: Fraunhofer-Gesellschaft zur Förderung der Angewandten Forschung E.V., Munich (DE)

(72) Inventors: Jan Hansmann, Darmstadt (DE); Sebastian Riess, Darmstadt (DE); William Kaal, Darmstadt (DE); Jonathan Millitzer, Darmstadt (DE); Christoph Tamm, Darmstadt (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 367 days.

(21) Appl. No.: 17/906,485

(22) PCT Filed: Mar. 19, 2021

(86) PCT No.: PCT/EP2021/057152
§ 371 (c)(1),
(2) Date: Sep. 26, 2022

(87) PCT Pub. No.: WO2021/186069
PCT Pub. Date: Sep. 23, 2021

(65) Prior Publication Data
US 2023/0184366 A1 Jun. 15, 2023

(30) Foreign Application Priority Data
Mar. 20, 2020 (DE) ...................... 10 2020 203 660.8

(51) Int. Cl.
*F16L 55/04* (2006.01)
*F15B 21/00* (2006.01)
(Continued)

(52) U.S. Cl.
CPC .......... *F16L 55/041* (2013.01); *F15B 21/008* (2013.01); *F16L 55/053* (2013.01); *F17D 1/20* (2013.01)

(58) Field of Classification Search
CPC ........ F16L 55/041; F16L 55/053; F15B 21/08
(Continued)

(56) References Cited

U.S. PATENT DOCUMENTS 1,765,929 A * 6/1930 Marsh ...................... F16L 55/05
138/30
1,862,228 A * 6/1932 Marsh ...................... F16L 55/04
138/30
(Continued)

FOREIGN PATENT DOCUMENTS

DE 1960369 A1 6/1971
DE 4318553 A1 12/1994
(Continued)

OTHER PUBLICATIONS

European Patent Office, International Search Report and Written Opinion in application No. PCT/EP2021/057152, dated May 11, 2021, 14 pages, Rijswijk, Netherlands.
(Continued)

*Primary Examiner* — David R Deal
(74) *Attorney, Agent, or Firm* — Marshall & Melhorn, LLC

(57) ABSTRACT

A device for reducing vibrations in a hydraulic system may have a separating device which has a side for delimiting a fluid-conducting cavity of the fluid system. The device may also have a vibration-reducing unit, which is designed to
(Continued)

mechanically adjust the rigidity of the separating device such that vibrations in the fluid system are reduced.

17 Claims, 8 Drawing Sheets

(51) Int. Cl.
 *F16L 55/053* (2006.01)
 *F17D 1/20* (2006.01)
(58) Field of Classification Search
 USPC .................................................. 138/26, 30
 See application file for complete search history.

(56) References Cited

U.S. PATENT DOCUMENTS

| | | | | |
|---|---|---|---|---|
| 2,489,491 | A * | 11/1949 | Johnson | F16L 55/053 |
| | | | | 138/30 |
| 2,997,059 | A * | 8/1961 | Mortimer | F16L 55/052 |
| | | | | 251/117 |
| 4,588,360 | A * | 5/1986 | Tuckey | F04C 15/00 |
| | | | | 417/540 |
| 5,538,478 | A * | 7/1996 | Nakakubo | F16H 7/1236 |
| | | | | 138/30 |
| 5,655,569 | A * | 8/1997 | Tackett | B60T 8/4275 |
| | | | | 220/721 |
| 5,732,740 | A * | 3/1998 | Hornyack | F16L 55/053 |
| | | | | 188/267 |
| 5,819,802 | A * | 10/1998 | Fan | F16L 55/055 |
| | | | | 138/30 |
| 6,405,845 | B1 * | 6/2002 | Muller | F16D 25/14 |
| | | | | 188/380 |
| 8,752,588 | B2 * | 6/2014 | Watanabe | B41J 2/175 |
| | | | | 138/30 |
| 2008/0292483 | A1 * | 11/2008 | De Koning | F16L 55/053 |
| | | | | 138/30 |
| 2014/0000740 | A1 * | 1/2014 | Wald | B60T 8/368 |
| | | | | 138/30 |

FOREIGN PATENT DOCUMENTS

| | | |
|---|---|---|
| DE | 10316946 A1 | 10/2004 |
| DE | 102011117534 A1 | 5/2013 |
| DE | 102011117620 A1 | 5/2013 |
| DE | 102015013281 A1 | 4/2017 |
| EP | 0679832 A1 | 11/1995 |
| EP | 2821262 A2 | 1/2015 |
| JP | H039194 A | 1/1991 |
| WO | 2008086777 A1 | 7/2008 |

OTHER PUBLICATIONS

German Patent Office, Office Action in Application No. DE 10 2020 203 660.8 dated Nov. 17, 2020, 10 pages, Munich, Germany.

* cited by examiner

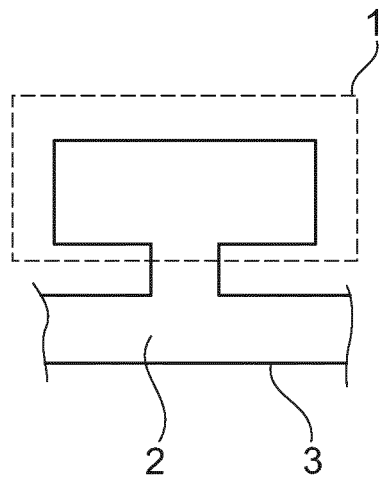
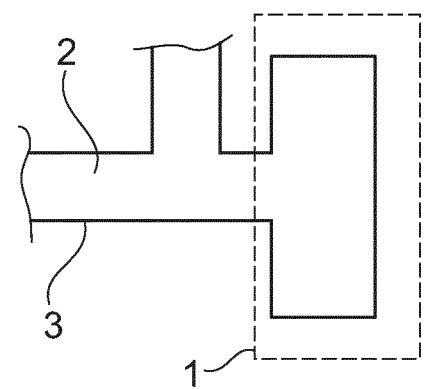
Fig. 1a              Fig. 1b
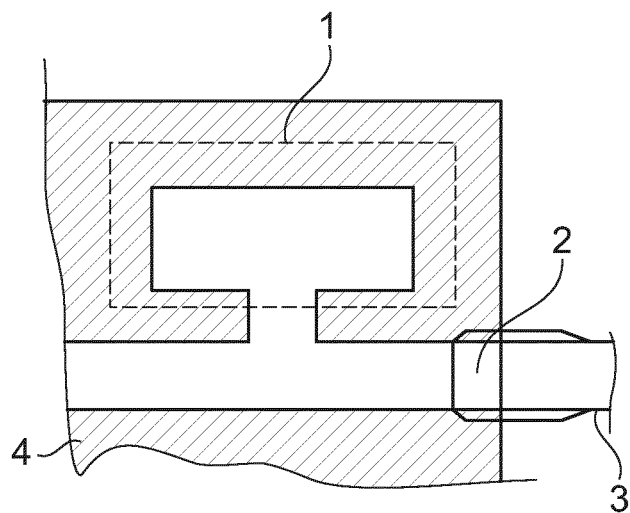
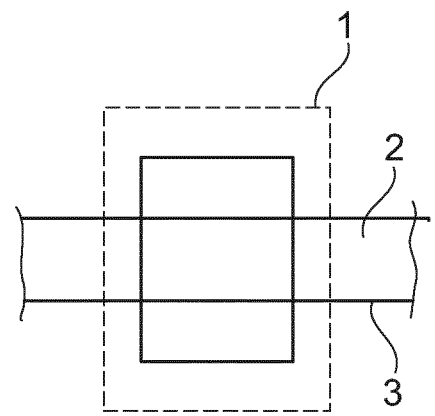
Fig. 1c              Fig. 1d

DEVICE FOR INFLUENCING, IN PARTICULAR REDUCING, VIBRATIONS IN A FLUID SYSTEM, AND METHOD FOR INFLUENCING, IN PARTICULAR REDUCING, VIBRATIONS IN A FLUID SYSTEM

FIELD

The present application is in the technical field of influencing, in particular reducing, vibrations in fluid systems, in particular hydraulic systems. The present application in particular relates to a device for influencing, in particular reducing, vibrations in a fluid system, in particular a hydraulic system, comprising a separating means which has a side for delimiting a fluid-conducting cavity of the fluid system. Furthermore, the application relates to a method for influencing, in particular reducing, vibrations in a fluid system.

BACKGROUND

Fluids (gases and liquids) are conducted in pipes, lines, hoses, or other cross sections in many technical systems. There are many reasons for this, and they depend on the technical system in question and its application. In many applications, undesired vibrations occur, i.e. fluctuations in pressure, which are transferred through the fluid. In some known hydraulic systems, the fluid used, e.g. water or oil, is used to transmit signals, forces, or energy. Hydraulic systems are used for example in machines and facilities (stationary hydraulics) or in mobile machines and vehicles (mobile hydraulics). In general, it is desirable for as little energy as possible to be required for operating the hydraulic system, and it is also desirable for there to be as little vibration and sound radiation as possible. Hydraulic systems generally comprise different components, for example pistons, engines, valves, accumulators, and pumps. These components are generally interconnected by hoses or lines.

The components of the hydraulic system can have a certain level of compression under load in relation to the fluid, resulting in what is known as "blowing rigidity" in some systems. The highest possible level of blowing rigidity, i.e. a low level of compression under load of the components in relation to the fluid, is desirable for the efficiency and the dynamics, in particular for the response behavior and/or the reaction speed. In a first approximation, the fluids used are often considered not to be compressible, but in practice these have a level of compression under load which can be described by the compressibility (described by the bulk modulus) of the liquid. The blowing rigidity, the compression under load of the fluid, and the moved masses (of the fluid or moved mass of components) result in a vibratory system having different resonances. This vibratory system is caused to vibrate by pumps or external influences, for example. In general, these vibrations result in negative effects, for example a shorter service life of the system, undesired influences of the function of the system, noises and sound, and vibrations being introduced into the environment. In particular, it may be necessary to dimension the system to be oversized because of pressure peaks. For example, pumps typically excite the system at a frequency which is proportional to its speed or a multiple thereof. This excitation is generally predominantly harmonic. External influences can also result in wide-band or pulse-like excitation.

SUMMARY

There are various solutions in the prior art by means of which the above-described vibration problems of hydraulic systems are reduced. For example, membrane accumulators, piston accumulators, or bladder accumulators for reducing the vibrations can be used. In general, these are attuned to fixed frequencies. An additional volume for the fluid in question is coupled. In this volume, the fluid is in contact with a membrane, a piston, or a bladder. This is generally supported on a gas volume in order to ensure a certain amount of compression under load. As a result, fluctuations in pressure and/or volume of the hydraulic system can be reduced. One drawback is that such solutions generally require a comparatively large amount of installation space. In other solutions, it may be provided that flexible hoses are used, which result in low blowing rigidity and mitigate pressure peaks. This may, however, result in lower energy efficiency and a reduced service life of the hoses. In further solutions, what are known as side-branch or quarter-wave resonators are used, which comprise an additional line of defined length which is closed at one end. Since, however, the sound velocity in a hydraulic fluid is dependent on the relevant pressure, it can be difficult to optimally attune such resonators, in particular if the quasistatic operating pressure of a hydraulic system changes during operation or for different operating states. In further solutions, Helmholtz resonators are used (analogously to tuned mass dampers). WO 2012/163318 A1 and U.S. Pat. No. 6,109,304 A, for example, describe prior art of a similar nature. In these documents, adaptive or adjustable Helmholtz resonators can in particular be used (analogously to adjustable tuned mass dampers). When using cylinders, in particular as resonators, however, sufficient sealing can pose difficulties. In addition, a volume change associated with varying the effective frequency may be problematic (pressure variations in the overall system, limited adjustment speed in order to prevent damage and undesired effects on the hydraulic system). In general, the force for the variation also has to operate counter to the hydraulic pressure, and this makes it necessary for there to be comparatively high actuator forces. In systems of this kind, comparatively high actuating forces and large installation spaces are typically required.

Against the background of the above-mentioned aspects, one problem addressed by the present application is to propose an improved device for influencing, in particular reducing, vibrations in a fluid system, in particular a hydraulic system, which overcomes the above-described drawbacks of the prior art. In particular, one problem addressed is to propose a device which makes it possible to influence, in particular reduce, vibrations in a rapid, reliable, and comparatively low-energy manner. In addition, one problem addressed by the present application is to propose an accordingly advantageous method for influencing, in particular reducing, vibrations in a fluid system.

These problems are solved by a device and method having the features of the claims. Advantageous developments are found in the features of the dependent claims and the exemplary embodiments.

The proposed device for influencing, in particular reducing, vibrations in a fluid system, in particular a hydraulic system, comprises a separating means which has a side for delimiting a fluid-conducting cavity of the fluid system. The device also comprises a vibration-influencing unit, in particular a vibration-reducing unit, which is designed to mechanically adjust the rigidity of the separating means such that vibrations in the fluid system are influenced, in particular reduced. The vibration-influencing unit is generally a unit for influencing the dynamic properties. In general, the separating means has its own rigidity (e.g. against bending/deforming). It may therefore be provided that the vibration-influencing unit provides a resulting, common rigidity of the separating means and the vibration-influencing unit. In exemplary embodiments in which elements other than the separating means also take on some of the separating function, it is not necessary, but it is possible, for the separating means to take on the majority of the separating function.

The mass of the fluid in the device in combination with the separating means and the vibration-influencing unit results in a vibratory system which can be characterized by a tuning frequency. This tuning frequency is changed by adjusting the rigidity by means of the vibration-influencing unit. Therefore, the proposed device can in particular reliably reduce harmonic, frequency-variable vibrations which are generated by pumps, for example. This is particularly applicable to speed-variable pumps, in which the tuning frequency is adjusted along with the excitation frequency to be reduced. In addition, vibrations of the fluid system can be reduced in one of its natural frequencies. This is particularly advantageous in systems in which this natural frequency is changed, for example by connecting further systems, and the tuning frequency of the device is accordingly adjusted along with this frequency.

In the proposed device, the rigidity is mechanically adjusted, for example by a solid-body spring element. Therefore, according to the proposed device for changing the tuning frequency, a gaseous component, e.g. a gas spring, which changes the tuning frequency by changing the pressure, is not necessarily required. In addition, comparable fluidic components for adjusting the rigidity are not necessarily required either, such as a fluid column, the volume of which is changed to change the tuning frequency; cf. an adaptive Helmholtz resonator according to the prior art. In particular, compared with the known adaptive Helmholtz resonators, the proposed device has the advantage that the fluid volume is not necessarily changed to adjust the tuning frequency. Accordingly, no additional compensation measures need to be provided in the overall hydraulic system. In addition, the proposed device makes rapid variation possible, since the device does not introduce any relevant pressure changes into the hydraulic system during the adjustment. In addition, in configurations in which the static pressure is compensated for, the variation of the natural frequency or tuning frequency is not carried out counter to the pressure of the hydraulic system. This makes it possible, for adjusting the tuning frequency, to use an actuator system or manual actuating apparatus which is characterized by it requiring a small amount of space, for example an electric motor that has comparatively small dimensions and is in particular shifted by means of a transmission. In addition to the advantage of the low amount of installation space, the proposed device results in the possible frequency range not being limited as in conventional Helmholtz resonators in that, at a certain length of the resonator chamber, standing waves form within the chamber.

In the proposed device, it may thus be provided that the rigidity of the separating means can be varied by the vibration-influencing unit. In this way, the device ensures that the rigidity of the separating means can be mechanically adjusted and varied by the vibration-influencing unit. By means of the vibration-influencing unit, the rigidity of the separating means can thus also be varied in a mechanical manner after the assembly of the device has been completed. The vibration-influencing unit generally comprises a mechanical element. The rigidity is then typically provided by the mechanical element. Therefore, the vibrations in the fluid system can be influenced by mechanically varying the rigidity. The proposed device is thus advantageous compared with known devices in which a spring assembly is provided but is designed to be installed in a fixed manner and so as not to be variable, i.e. adjustable. In known devices of this kind, once it is selected first of all and has been installed, the spring assembly no longer ensures any variation of rigidity. By way of example, in this context, reference is made to the damping device disclosed in DE 10 2015 013 281 A1.

In addition, the present application relates to an accordingly advantageous method for influencing, in particular reducing, vibrations in a fluid system, in which a device as described above or below is provided. The rigidity of the separating means is then adjusted by means of the vibration-influencing unit such that vibrations in the fluid system are reduced. Within the meaning of this application, a reduction in the vibrations is also understood to mean completely damping these vibrations such that no further vibrations can occur. The proposed device can generally be used for influencing vibrations or for influencing the dynamic behavior (vibration behavior) of the fluid system or hydraulic system.

In typical exemplary embodiments, the vibration-influencing unit comprises a solid-body spring element. The solid-body spring element may for example form part of the separating means or may be connected to or in contact with the separating means. The solid-body spring element may for example be made of metal, plastics material, and/or wood. The solid-body spring element may be fiber-reinforced. The solid-body spring element may for example be supported on one side. In some configurations, the solid-body spring element is a bending beam. The adjustability of the rigidity can be implemented such that a free length of the bending beam is changed by a suitable vibration-influencing unit.

In preferred configurations, it may be provided that the vibration-influencing unit is designed to adjust the rigidity of the separating means by means of a rotational movement. In this way, with a compact structure, it can be ensured that the vibration-influencing unit can be effectively actuated when it is actuated both manually and automatically.

In typical configurations, for mechanically adjusting the rigidity, the vibration-influencing unit comprises mechanical means which are or can be coupled mechanically to the separating means, generally to a side of the separating means facing away from the fluid-conducting cavity or, in possible configurations, to a side of the separating means facing the fluid-conducting cavity, such that the rigidity is adjusted by moving the mechanical means.

In some configurations, the vibration-influencing unit comprises connectors. For adjusting the rigidity, the connectors are or can be in contact with or brought into contact with, and/or are or can be connected, in particular rigidly, to the separating means, in particular to a side of the separating means facing away from the fluid-conducting cavity. For example, the rigidity can be adjusted by displacing the connectors relative to the separating means. Additionally or alternatively, the rigidity can be adjusted by moving components that are in direct or indirect contact with the connectors relative to the connectors.

In particularly preferred configurations, the vibration-influencing unit comprises at least one spring washer and a connector retainer mounted so as to be rotatable relative to the spring washer. In different configurations, the spring washer can be designed in one piece or multiple pieces. The spring washer can be in contact with the separating means via connectors connected to the spring washer in a stationary manner. In addition, the connector retainer can be in contact with the spring washer via connectors connected to the connector retainer in a stationary manner. In this way, the rigidity can be precisely adjusted in a simple manner by rotating the connector retainer relative to the spring washer. The connector retainer and/or the spring washer can be formed as part of a planar or annular component.

By rotating the connector retainer relative to the spring washer, support regions at which the connectors come into contact with the separating means and/or the connector retainer and/or the spring washer are changed. As a result, surface elasticity that has an effect transversely to the separating means can be changed. When the connectors which are connected to the connector retainer in a stationary manner overlap with the connectors which are connected to the spring washer in a stationary manner, the effective surface rigidity of the separating means is generally at its greatest. If support points of the connectors come into positions each having mutual offset angles by the spring washer and the connector retainer being rotated relative to one another, the surface rigidity acting transversely to the separating means is reduced to the greatest possible offset angle at which the surface rigidity is at a minimum. In order to vary the rigidity of the separating means, it is therefore merely necessary to rotate the spring washer relative to the connector retainer.

In some configurations, it is provided that the device is designed to make it possible to adjust the rigidity manually. Additionally or alternatively, the adjustment of the rigidity can be actuated automatically, for example by an electric motor.

Typically, the device comprises a housing. In this case, the connector retainer is rotatable relative to the housing in typical configurations. In general, the separating means is secured against rotating relative to the housing here. For example, the device can be designed to allow the connector retainer to be rotated manually. In this case, the rigidity and tuning frequency can thus be adjusted particularly easily by a user. In some configurations, a motor can also be provided. The motor can be designed to bring about a rotation of the connector retainer relative to the housing. In this configuration, the rigidity can be particularly easily controlled in an automated manner.

In some configurations, an apparatus for compensating for the static components of the pressure is provided. This can be actuated in a manual or automated manner. As explained in greater detail below, this apparatus may for example comprise a spring and/or a second cavity, which are in contact with the separating means. In the case of a second cavity, the static components of the pressure can be compensated for by adjusting a gas pressure in the second cavity.

In some configurations, it is provided that the separating means is a membrane or a bladder. In many exemplary embodiments, however, the separating means is a piston. In typical configurations, it is also provided that the separating means is mounted so as to be translationally movable. According to this example, the device can compensate for the static pressure of the fluid and can in particular be designed for storing energy by compressing the gas in a second cavity, which is described in greater detail below. Furthermore, it may be provided that the device comprises a spring, in particular a helical spring. The spring can press on a side of the separating means facing away from the fluid-conducting cavity and/or facing the fluid-conducting cavity such that a static pressure in the fluid-conducting cavity is compensated for by deforming the spring and displacing the separating means. In some configurations, it is provided that a preload of the spring can be adjusted. In this way, it is possible to adapt to different static pressure components.

In typical configurations, it is provided that the separating means separates the fluid-conducting cavity from the second cavity. In most configurations, the vibration-influencing unit is arranged in the second cavity at least in part. The second cavity can be filled with gas, in particular filled with air, for example. Typically, the second cavity can be pressurized. For example, it may be provided that the second cavity is or can be closed in a gas-tight manner. In this way, the second cavity provides an additional option for adjusting the tuning frequency by a pressure being adjustable in the second cavity. In addition, a gas volume in the second cavity can act as an air spring. For example, the second cavity may be connected to a valve. The valve may be in fluid communication with the second cavity and may be part of the device. By the valve being provided, there is an additional option for adjusting the level of damping. It may be provided that the valve can be regulated, in particular by a flow cross section being adjustable.

In some configurations, the device comprises a second separating means. The second separating means may be translationally displaceable. In addition, the second separating means may separate the second cavity from a third cavity. It may be provided that the third cavity is in a fluid connection to the fluid-conducting cavity, in particular by a connecting line. The connecting line may have a smaller cross section than the fluid-conducting cavity and in particular than the second and/or third cavity. In this way, the static component of the pressure in the fluid can be automatically compensated for. It may also be provided that the connecting line comprises a valve, in particular a throttle valve, or a shut-off valve.

In some configurations, the fluid-conducting cavity surrounds a line of the fluid system, in particular concentrically. For example, it may be provided that the fluid-conducting cavity circumferentially surrounds the line over an angular range of at least 90 degrees, at least 180 degrees, at least 270 degrees, or completely. The fluid-conducting cavity and/or the line can be part of the claimed device. This configuration is characterized by a highly integrated design and therefore saves a lot of space. It is generally provided that the fluid-conducting cavity and the line are interconnected for fluid communication via openings. Opening cross sections of these openings can be varied in some configurations. In this configuration, the separating means is generally annular.

In some configurations, it is provided that the separating means comprises a translationally displaceable first separating means portion. In addition, the separating means can comprise a translationally displaceable second separating means portion. The second separating means may be translationally displaceable relative to the first separating means portion. In addition, a seal may be formed between the first and the second separating means portion. The vibration-influencing unit may be connected to the first separating means portion and the second separating means portion such that the vibration-influencing unit takes effect between the first separating means portion and the second separating means portion and is translationally displaceable together with the first separating means portion and the second separating means portion. In general, the first separating means portion, the second separating means portion, and the vibration-influencing unit are displaceable relative to the housing of the device, in particular mounted so as to be translationally displaceable. In this process, the vibration-influencing unit is generally supported on the first and the second movable separating means portion, in particular without the vibration-influencing unit being required to be supported on the housing, meaning that the vibration-influencing unit itself or parts thereof are not deflected by static pressure components, such that the adjustment of the rigidity is not influenced by the static pressure components. Therefore, the vibration-influencing unit for influencing and in particular reducing the vibrations in the fluid system can be attuned to the dynamic fluctuations in pressure in a targeted manner. Furthermore, it may be provided that a sealing region between the separating means and the housing has an in particular increased, for example adjustable, breakaway torque. In general, the sealing region between the separating means and the housing has increased friction compared with the sealing between the separating means portions. This and/or an inertia of the first separating means portion that is considerably lower than the second separating means portion are generally provided.

In some configurations, the device comprises a control unit. The control unit can be connected to the vibration-influencing unit for adjusting the rigidity such that the rigidity can be adjusted by the control unit. In this case, the control unit can be designed to adjust the rigidity on the basis of acceleration sensor signals and/or pressure sensor signals and/or a pump speed and/or on the basis of virtually calculated signals and/or distance variables and derived variables, such as accelerations. In this way, the device is suitable for automatically reducing vibrations by automatically adjusting the tuning frequency. It may be provided that the control unit is designed to output a control signal to the vibration-influencing unit and in particular to an adjusting actuator system thereof, in particular to the motor. The tuning frequency can be adjusted by adjusting the rigidity to the pump speed and/or a multiple thereof by means of the control unit. The acceleration sensor signal and/or pressure sensor signal is generally output by a sensor that is in a direct or indirect connection to the fluid. The control unit may be designed to convert the acceleration sensor signal and/or pressure sensor signal into the frequency domain, in particular by means of a Fourier transform. The tuning frequency can be adjusted by adjusting the rigidity to this frequency signal by means of the control unit. It may also be provided that the control unit is designed to adjust the rigidity on the basis of signals from two acceleration or pressure sensors. The sensors may be designed to measure the acceleration or pressure at points in the fluid system between which the fluid-conducting cavity is arranged. The signals from these sensors can be converted into the frequency domain by the control unit. The tuning frequency can then be adjusted by adjusting the rigidity such that transmission of the frequency components to be reduced between the sensors is reduced.

The device may also comprise a coupling sensor. The coupling sensor may be designed to detect a further component being coupled to the fluid system. In addition, the control apparatus may be provided and designed to adjust the rigidity on the basis of a signal from the coupling sensor. In this way, natural-frequency changes in the fluid system resulting from coupling the further component can be taken into account in a simple, rapid manner when influencing or reducing the vibrations. In a method for influencing vibrations in the fluid system, the rigidity of the separating means can thus be adjusted on the basis of the signal from the coupling sensor.

The device may also comprise an actuator system, which is in particular connected to the separating means. It may be provided that the actuator system is designed to actively introduce forces into the fluid, in particular by moving the separating means, for example setting it into vibration. By means of the actuator system, in addition, vibrations in the fluid system can be reduced and/or signals can be transmitted in a targeted manner. For example, it may be provided that the actuator system is designed to bring about vibration of the separating means. In typical configurations, the actuator system comprises a voice coil actuator and/or a piezo actuator. In typical configurations, the actuator system is connected to the control unit and can be actuated thereby.

The fluid is preferably largely non-compressible and may be hydraulic liquid, oil, or water, for example. In principle, however, it is possible to also use some exemplary embodiments of the device in systems having a compressible fluid, for example air or gas. The fluid system may for example be a mobile or stationary hydraulics facility. For example, the fluid system may be or comprise a hydraulic drive or a pump. Furthermore, the fluid system may be or comprise a water supply system. In addition, the fluid system may be or comprise fuel injection, in particular of engines. Furthermore, the fluid system may be or comprise a suction tube of an internal combustion engine, wherein the cavity can be arranged on the suction tube. Furthermore, the fluid system may be or comprise an air inlet of a turbocharger, wherein the cavity can be arranged on the air inlet. In addition, the fluid system may be or comprise an exhaust train, in particular between a cylinder and an exhaust turbocharger, wherein the cavity can be arranged on the exhaust train.

The present application may also relate to the fluid system, in particular the hydraulic system. The fluid system may comprise the device described above or below. In addition, the fluid system may for example contain a pump and/or a consumer, in particular a hydraulic consumer. Additionally or alternatively, the fluid system may contain a line, which connects the pump to the consumer in some configurations. The fluid-conducting cavity may be in a fluid connection to the line. In some configurations, the separating means is arranged on the line.

Features that are set out either above or below in relation to the device for influencing, in particular reducing, vibrations in the fluid system, or in relation to the fluid system, are accordingly applicable to the method, and vice versa.

DESCRIPTION OF THE FIGURES

Exemplary embodiments will be described in the following with reference to the drawings, in which:

FIG. 1(a) shows a possible arrangement of a device for reducing vibrations in a fluid system, FIG. 1(b) shows another possible arrangement of a device for reducing vibrations in a fluid system, FIG. 1(c) shows another possible arrangement of a device for reducing vibrations in a fluid system, FIG. 1(d) shows another possible arrangement of a device for reducing vibrations in a fluid system.

DETAILED DESCRIPTION

FIG. 1(a) to (d) show possible schematic arrangements of a device 1 for reducing vibrations in a fluid system, in particular a hydraulic system. In general, this device 1 may, however, also be used for influencing vibrations in the fluid system. Dynamic properties of the fluid system can be adapted by means of this device 1. FIG. 1(a) shows the integration of the device 1 on a linear line 3 of the hydraulic system designed as a hose or channel. The line 3 conducts a fluid or a hydraulic liquid 2, but can also conduct a gas in other configurations. In FIG. 1(b), the device is fluidically connected to a curvature in the line 3. Repeated features are provided with identical reference signs in this figure and the following figures. FIG. 1(c) schematically shows a structural integration of the device 1 in a housing 4 of another component, for example the housing of a pump (not shown) or a control block or valve block. FIG. 1(d) schematically shows an embodiment of the device 1 in which it is guided concentrically around the line 3, and this is described in greater detail below. This concentric arrangement is also possible within a housing 4, for example within a pump housing.

Figure 2:
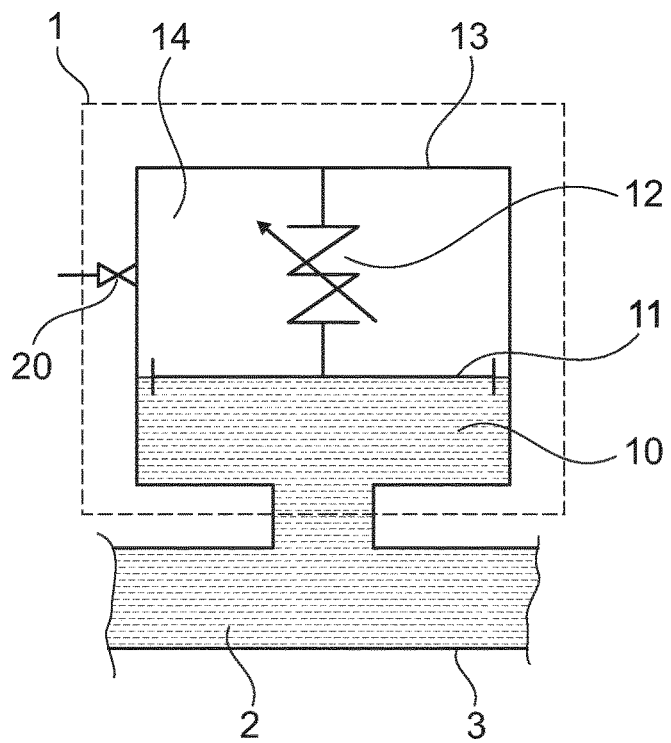
FIG. 2 is a schematic view of the device.

FIG. 2 schematically shows the structure of a proposed device 1. The device 1 comprises a housing 13. A fluid-conducting cavity 10, i.e. a volume which can be filled with the fluid 2, is located in this housing 13. The fluid-conducting cavity 10 can be separated from a second cavity 14, i.e. a further volume, by a separating means 11 (e.g. piston, membrane, bladder). In typical configurations, the volume 14 is gas-tight and can be pressurized via a valve 20, for example. In the main features described above, the device is comparable to a piston accumulator, membrane accumulator, or bladder accumulator as known from the prior art. However, the proposed device 1 comprises a vibration-influencing unit designed as a vibration-reducing unit 12, which acts on the separating means 11, i.e. an adjustable rigidity. With the (proportional) mass of the fluid in the device 1 in combination with the vibration-reducing unit 12 or adjustable rigidity, this structure results in a vibratory system which can be characterized by its tuning frequency. This tuning frequency is changed by changing the rigidity of the separating means by means of mechanical adjustment by the vibration-reducing unit. Furthermore, the tuning frequency can also be influenced in a targeted manner by selecting or changing the mass of the separating means 11 in a targeted manner. In some configurations, the device 1 comprises the following sensor system: A pressure sensor (not shown) in the volume 10, a distance/speed or acceleration sensor on the separating means 11 and/or on the housing 13, and/or a temperature sensor on the housing 13 or in the volume 10.

Figure 3:
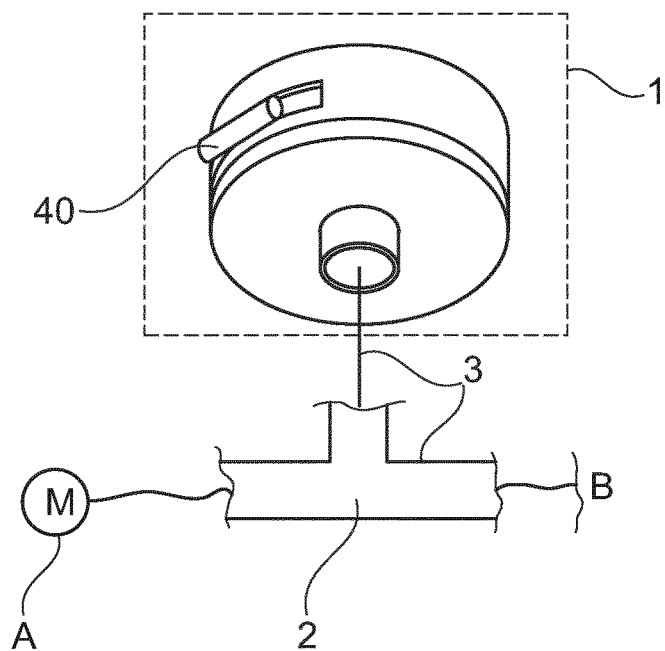
FIG. 3 is a partially perspective view of the device.

FIG. 3 is a partially schematic, partially perspective view of the device 1 on a hydraulic system (shown in a simplified manner) which contains a pump A, a system of a plurality of lines 3, and hydraulic consumers B (for example cylinders or actuators). If a speed-variable pump A generates pressure pulses at a certain, speed-dependent frequency, the device 1 can be used to reduce these vibrations. The device 1 then functions analogously to a tuned mass damper. To do this, the tuning frequency of the device 1 is adapted by adapting the vibration-reducing unit or adjustable rigidity 12 such that this falls to the frequency to be absorbed to the greatest possible extent. If the tuning frequency of the device 1 is adjusted along with the changing speed of the pump A, the device functions analogously to a neutralizer.

Figure 4:
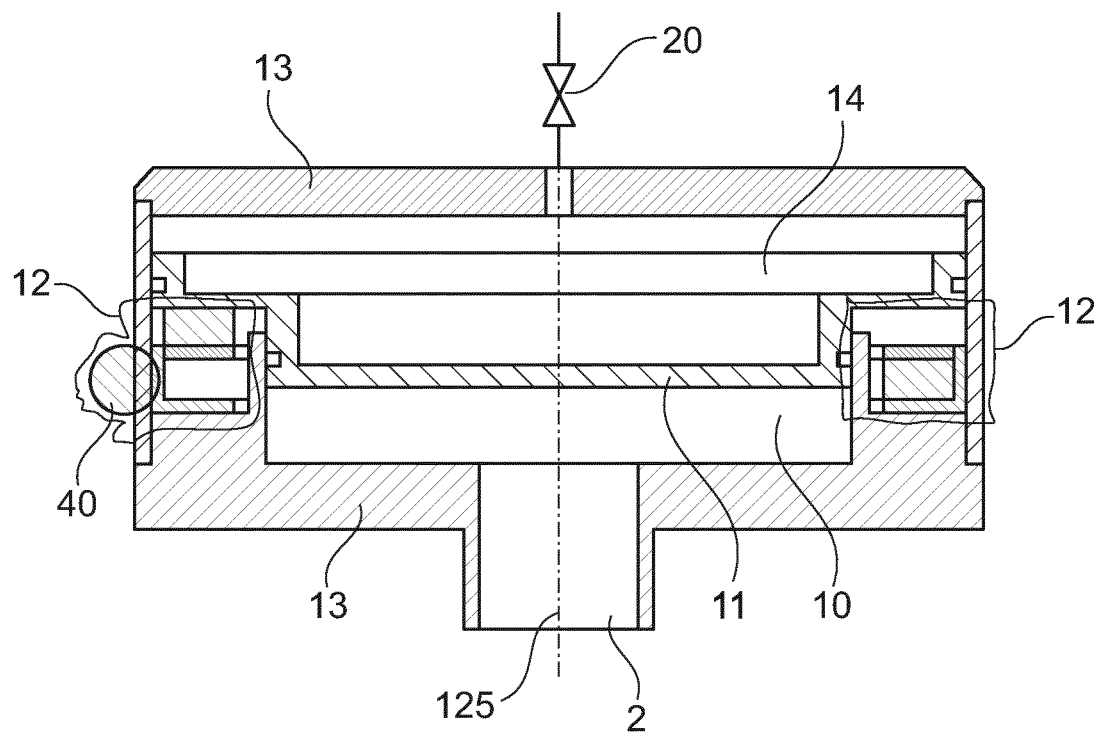
FIG. 4 is a cross-sectional view of the device.

FIG. 4 is a cross section through the device 1 shown schematically in FIG. 3. The fluid 2 transported from the hydraulic system via the line 3 fills the fluid-conducting cavity 10 in the housing 13 in the device. The fluid-conducting cavity 10 is separated from the second cavity or the second volume 14 via a separating means 11 in the form of a piston. This second volume may be gas-tight and may be filled with a gas by the valve 20, for example. The filling pressure in the second cavity 14 can be used to compensate for a static pressure component in the fluid 2. When selecting the gas pressure for the volume 14 that is required for this purpose, the ratio of the effective surface areas of the piston 11 to the volumes 14, 10 should be taken into account. If the valve 20 is connected to a further gas volume and if this valve is adjustable in cross section, this valve can also be used for adjusting damping. The piston 11 is mounted so as to be translationally movable along the main axis 125 of the device 1. In the example shown, the piston 11 is also secured against rotating about this main axis 125.

Figure 5:
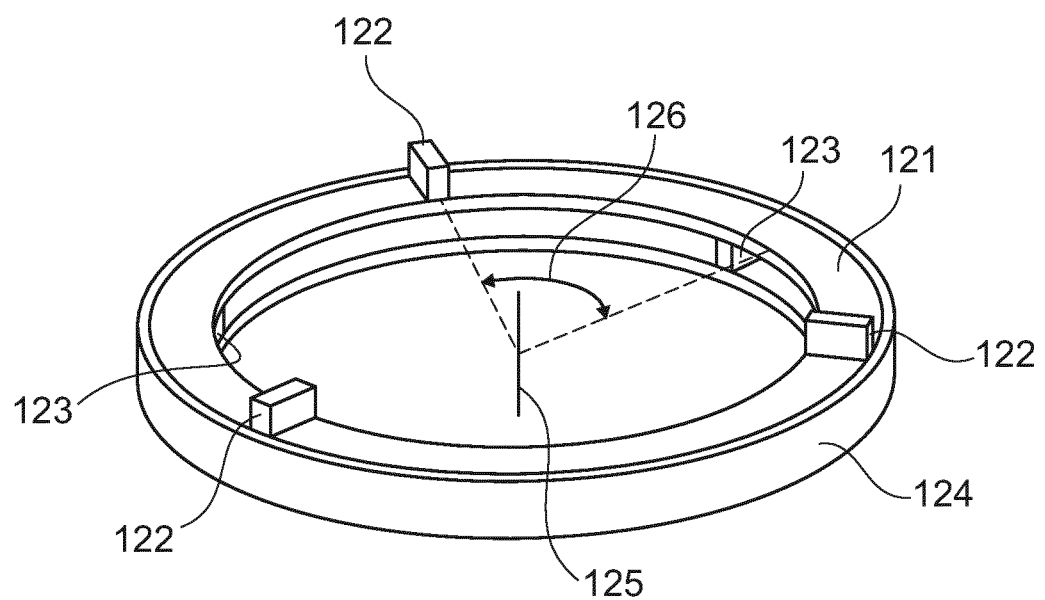
FIG. 5 is a perspective view of a vibration-reducing unit.

Furthermore, the piston 11 is connected to the vibration-reducing unit 12, i.e. the device for implementing an adjustable rigidity. A possible implementation of the vibration-reducing unit 12 is schematically shown in FIG. 5. The vibration-reducing unit 12 comprises a spring washer 121, for example made of metal, plastics material, or fiber-reinforced material, and also three connectors 122, which are rotationally fastened to the piston 11 in a stationary manner so as to be divided by 120°, for example (or 90°, for example, if there are four connectors per side). Furthermore, the connectors 122 are connected to the spring washer 121 in a stationary manner. Three further connectors 123, which are connected to a connector retainer 124 in a stationary manner so as to be divided by 120°, are arranged on the opposite side of the spring washer. The connector retainer 124 is mounted so as to be rotatable about the main axis 125 relative to the housing 13. This allows an angle 126 to be adjusted between the connectors 122 on the upper face and the connectors 123 on the lower face. This angle determines the rigidity of the adjustable spring element in the direction of the main axis 125.

If the outer surface of the connector retainer 124 is provided with suitable teeth (not shown), these can be used in combination with a worm 40 (see FIGS. 3 and 4) to rotate the connector retainer 124 and to thus adjust the rigidity and the associated tuning frequency of the device 1. This makes it possible to manually vary the rigidity and thus manually adjust the tuning frequency, for example by manually rotating the device 1 once for the rigidity adjustment.

Figure 6:
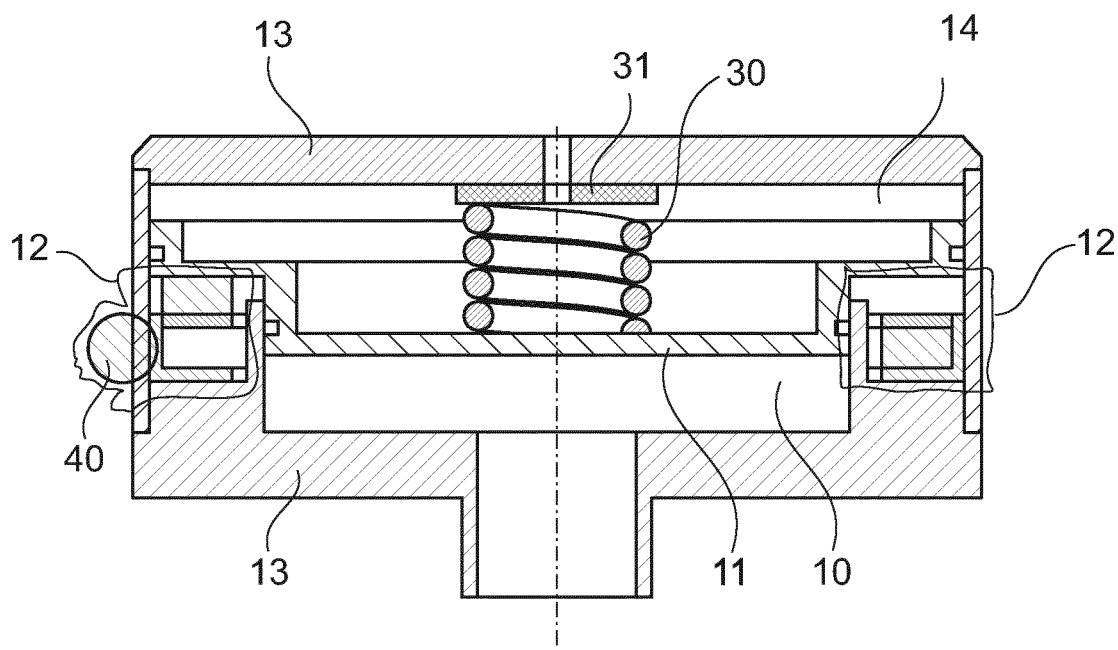
FIG. 6 is a cross-sectional view of the device.

FIG. 6 shows an exemplary embodiment in which a static pressure component of the fluid 2 in the fluid-conducting cavity 10 is absorbed by a spring 30, in particular a helical spring. In this case, the second cavity 14 is not designed to be gas-tight. Furthermore, an apparatus 31 which is known per se and is not described in greater detail and which makes it possible to adjust a preload on the helical spring 30 can be integrated. As a result, it is possible to adapt to different static pressure components. A valve 20 (not shown here) between the volume 14 and the surrounding atmosphere can be used to adjust the level of damping of the device; cf. the above comments on FIG. 4.

Figure 7A:
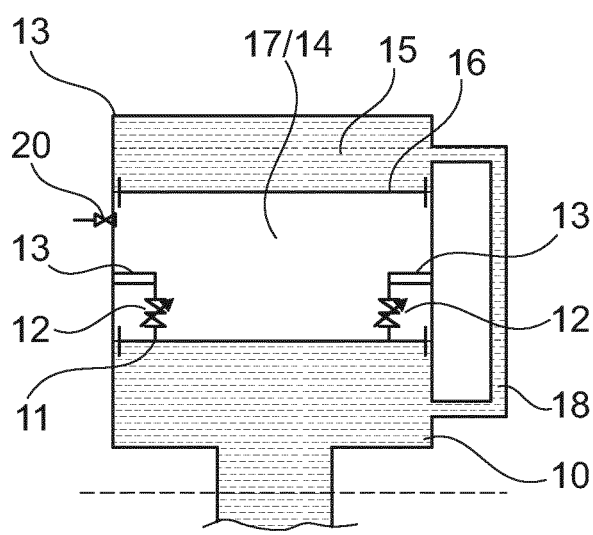
FIG. 7(a) is a schematic view of a device according to a further exemplary embodiment.
Figure 7B:
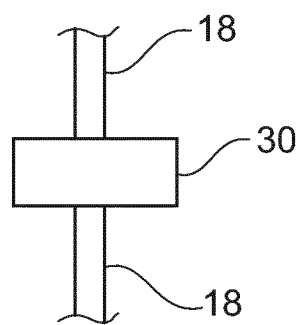
FIG. 7(b) is a different schematic view of a device according to a further exemplary embodiment.

FIGS. 7(*a*) and (*b*) show a further variant of the above-described device 1. As described, the fluid-conducting cavity 10 or the fluid volume is separated via the piston 11 from the second cavity 14 or the gas volume which can be filled via the valve 20. Furthermore, the vibration-reducing unit 12 or adjustable rigidity is supported on the housing 13 as usual. A further separating means 16 or a further piston is arranged in series with the gas volume 14. This separates the gas volume 14 from a third cavity 15 or a further fluid volume. The volumes 10, 15 are connected via a connection 18. The aim of this connection 18 is to automatically compensate for the static component of the pressure in the fluid. To do this, the cross section of the connection can either be designed to be very small or a further measure 30 can be integrated in the connection 18; see FIG. 7(*b*). This measure 30 may be a throttle, a valve, or a shut-off valve, for example. The latter can, for example, be opened at specified points in time or at those initiated by a control unit in order to perform pressure compensation between the volumes 10, 15.

Figure 8:
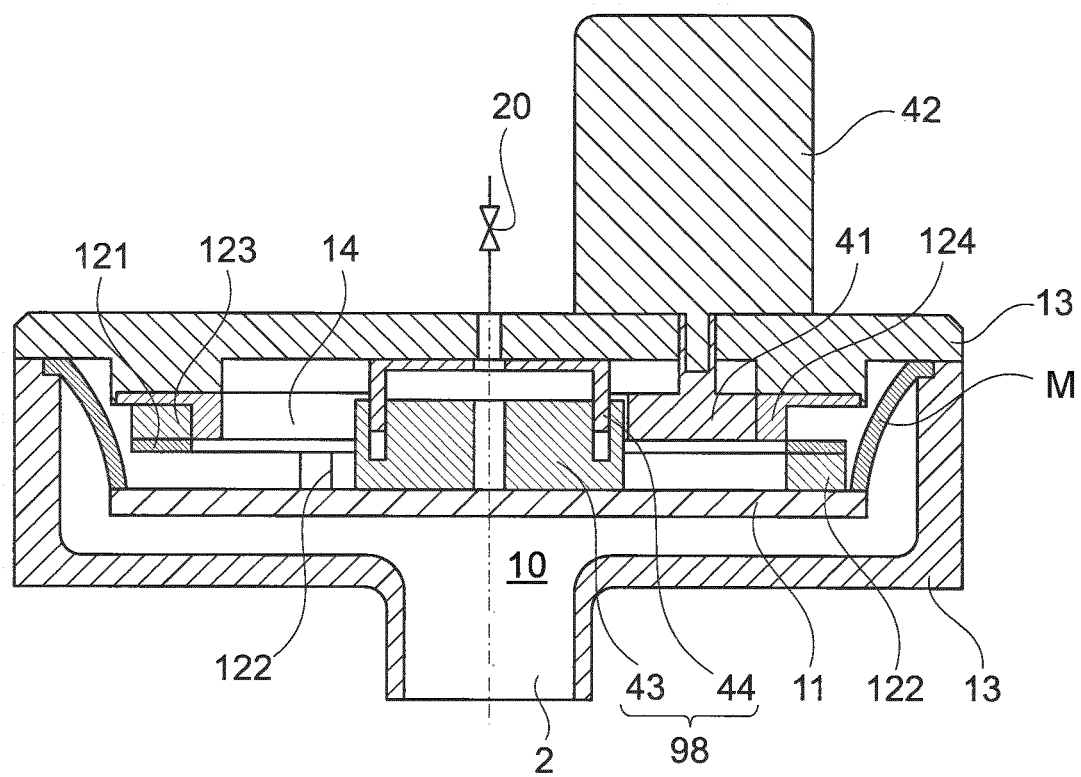
FIG. 8 is a cross-sectional view of the device according to a further exemplary embodiment.

FIG. 8 shows a further exemplary embodiment of the device 1 in which the fluid-conducting cavity 10 or the fluid volume is separated from the second cavity 14, i.e. from the volume 14, by means of a membrane M and a separating means 11 in the form of a plate 11. In accordance with the above examples, the volume 14 may be gas-tight and may be used for compensating for static pressure components in the fluid 2 and/or in the chamber 10. In the example shown, the vibration-reducing unit shown in FIG. 5 is again used for implementing the adjustable rigidity 12. The three connectors 122 are each fastened to the plate 11 in a stationary manner so as to be rotated by 120° and are connected to the spring washer 121. Said spring washer is connected on the opposite side to the three connectors 123, which are connected to the connector retainer 124 in a stationary manner so as to be rotated by 120°. The connector retainer 124 is mounted relative to the housing 13 such that it has a degree of freedom. The connector retainer 124 can be rotated about the main axis. If the connector retainer 124 is provided with teeth on the inside, the rigidity of the vibration-reducing unit 12 (shown in the form of the individual components 121, 122, 123 and 124) can be adjusted by means of a motor 42, which engages in the inner teeth of the connector retainer via a shaft and a further gear wheel 41. Furthermore, an actuator system 98 in the form of a voice coil actuator, comprising a coil 44 and a magnet 43, is integrated in the device 1. The voice coil actuator makes it possible to actively introduce forces into the fluid 2, by means of a suitable power amplifier, corresponding signal processing in a control unit, and a sensor system.

Figure 9A:
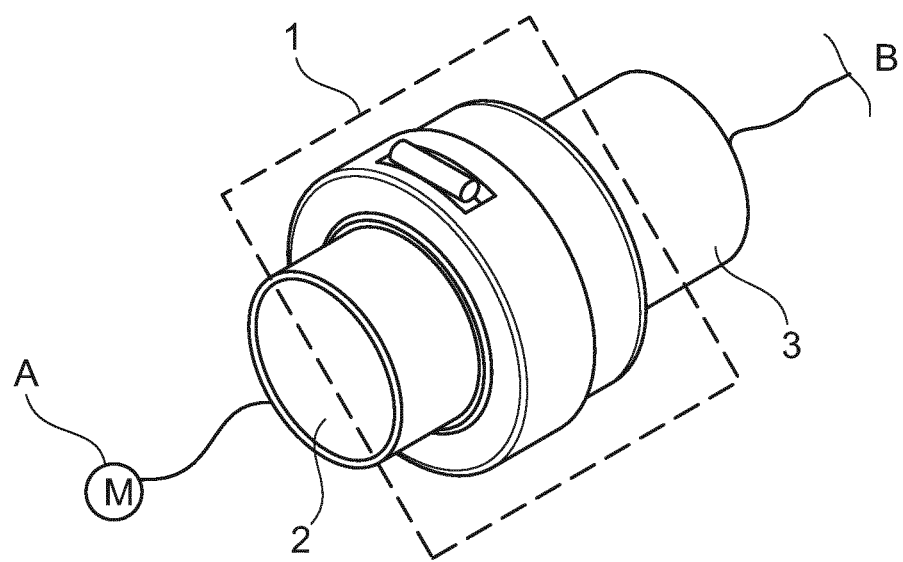
FIG. 9(a) is a schematic view of the device according to a further exemplary embodiment.
Figure 9B:
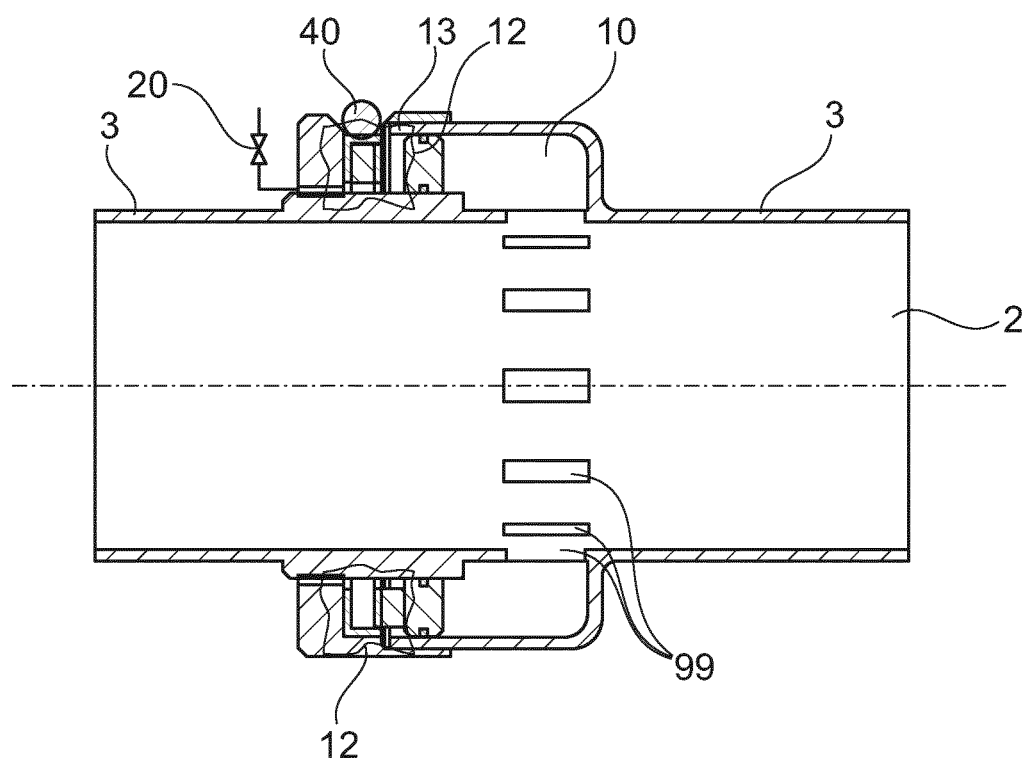
FIG. 9(b) is another schematic view of the device according to a further exemplary embodiment.
Figure 9C:
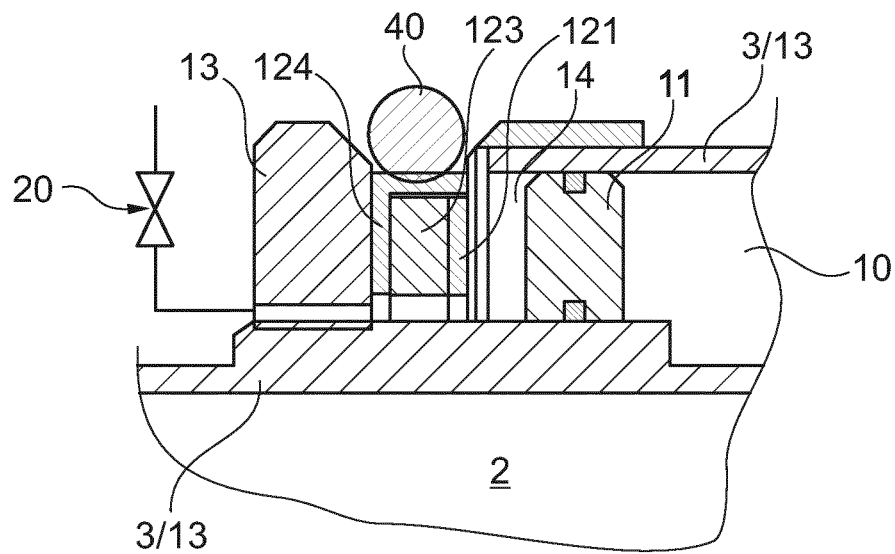
FIG. 9(c) is another schematic view of the device according to a further exemplary embodiment.

FIG. 9(*a*) to (*c*) schematically show a further embodiment of the device 1, which may in particular be advantageous if tight installation spaces or a highly integrated design are desired or required. In this case, the housing 13 is designed as part of the line 3 or the hose, preferably concentrically. The fluid 2 can thus flow through the device 1. The fluid-conducting cavity 10 or the fluid volume 10 is arranged concentrically around the line 3. The volume 10 is connected to the line 3 by openings 99 in this line. These openings may be rectangular, as shown, but may also have other, different shapes or cross sections. In particular, these cross sections may also be variable, for example by sliders or stops (not shown). The separating means 11 or the piston 11 also separates the fluid volume 10 from the second cavity 14 or the further volume 14 here and is supported on the vibration-reducing unit 12 or adjustable rigidity, which is in turn supported on the housing 13, which is designed as part of the line 3 in the exemplary embodiment shown. FIG. 9(*c*) shows a region of the embodiment in greater detail.

The fluid volume 10 is separated from the volume 14 by the piston 11 likewise arranged concentrically with the line. In this embodiment, said volume can optionally be gas-tight and, in this case, can be pressurized, e.g. via a valve 20, in order to compensate for static pressure components in the fluid 2. The piston is supported on the adjustable rigidity 12, which is also implemented here by way of example according to FIG. 5. In the example shown here, too, the necessary rotation of the connector retainer, by means of which the rigidity is adjusted, can be carried out via the schematically shown worm drive, comprising the combined connector retainer 124 which has the worm gear 124 and the worm together with the drive shaft 40. Analogously to FIGS. 7(*a*) and (*b*), the structure from FIG. 9(*a*) to (*c*) is also conceivable, comprising a second separating means 16 and a second fluid chamber 15, which is connected to the volume 10 by a connection 18. In a corresponding structure, this connection 18 can be provided for pressure compensation also between the fluid chamber 15 and the fluid 2 in the line 3 or pipe, for example by means of a radial hole at the level of the chamber 15.

Figure 10:
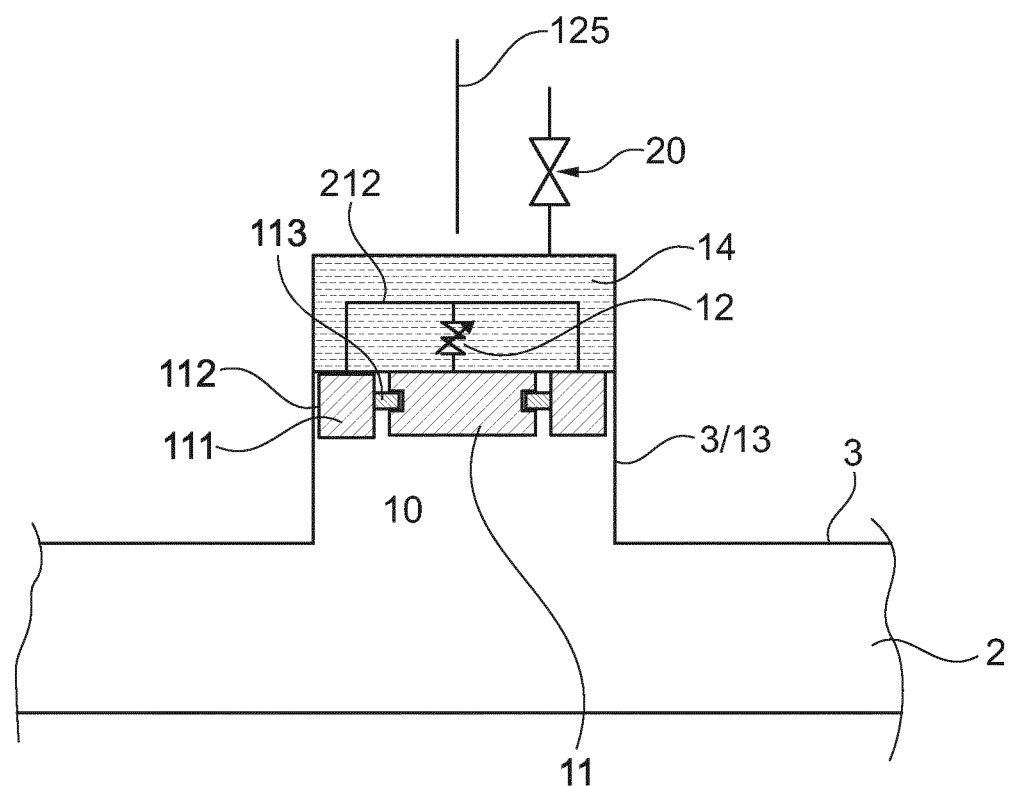
FIG. 10 is a schematic cross-sectional view of the device according to a further exemplary embodiment.

FIG. 10 schematically shows a further example of a configuration of the device 1. The housing 13 of the device 1 is connected to the pipe/line 3 directly or indirectly (e.g. by being screwed together). In this embodiment, the fluid-conducting cavity 10 or the fluid volume 10 and the second cavity 17 or the volume 14 are separated from one another by two separating means portions 111 and 11. In the example shown, these separating means portions 111, 11 are both designed as pistons; however, in particular the first separating means portion 11 may also be designed as a membrane. The second separating means portion 111, in particular the piston 111, is mounted so as to be movable in the direction of the main axis relative to the housing 13. In this case, a sealing region 112 between the piston 111 and the housing 13 is preferably designed such that it has a defined breakaway torque. In a particularly preferred embodiment, this breakaway torque is adjustable. The piston 11 is mounted so as to be movable in the direction of the main axis of the device relative to the piston 111. The seal 113 between the two pistons 111 and 11 is preferably designed such that it has the lowest possible friction. The vibration-reducing unit 12 or adjustable rigidity 12 supports the piston 11 relative to the piston 111 by means of the connection 212. The volume 14 is designed to be gas-tight and is pressurized. As a result, this volume functions as an air spring.

If the static pressure component in the fluid 2 and thus the fluid volume 10 then changes, the entire structure made up of the two pistons 11 and 111 and the adjustable rigidity 12 is displaced relative to the housing 13. The breakaway torque between the piston 111 and the housing 13 determines from which pressure differential between the volumes 10 and 14 the structure is displaced. As a result, the adjustable rigidity 12 is not deflected by static pressure components, but only by the dynamic fluctuations in pressure.

As FIG. 10 shows, in the device according to the invention, a structural separation between the fluid 2 and the fluid volume 10 is not necessarily required. In Helmholtz resonators according to the prior art, what is known as a neck is required, however, in order to provide a vibrating mass of the resonator. In contrast, in the proposed device 1, this mass can also be provided by the mass of the separating means 11. As already explained above, the configuration shown is suitable for compensating for static pressure components in an automated manner.

Figure 11:
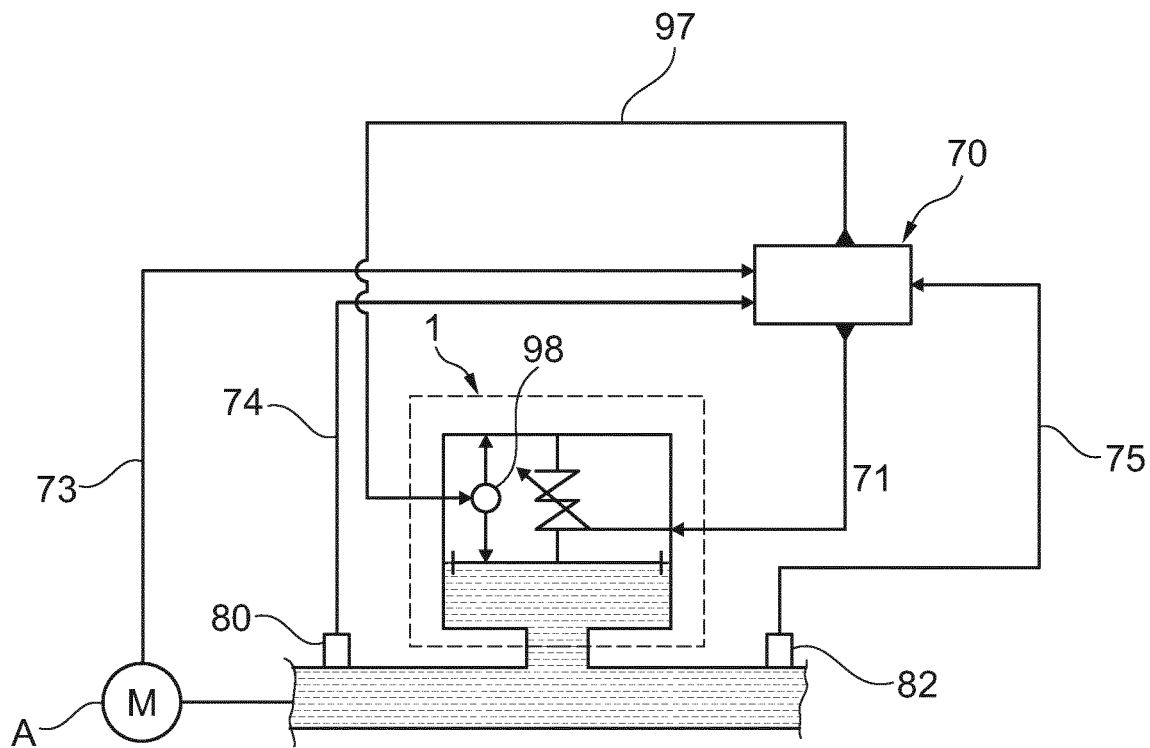
FIG. 11 shows a fluid system comprising the proposed device.

FIG. 11 is a schematic view of a hydraulic system comprising a device 1 according to the invention and an open-loop or closed-loop control system for operating the device. A control unit 70 is used to adjust the tuning frequency of the device 1. To do this, the control unit 70 provides a suitable signal 71 to an adjusting actuator system integrated in the device 1 (cf. e.g. servomotor 42 in FIG. 8) in order to adapt its tuning frequency. The tuning frequency of the device 1 can for example be generated by the control unit 70 (open-loop or closed-loop control apparatus) on the basis of a speed signal 73 (or a part or multiple thereof) which is output by a pump A or measured at said pump. The tuning frequency of the device 1 can for example also be generated by the control unit 70 (open-loop or closed-loop control apparatus) on the basis of an acceleration or pressure value 74 which is measured at the line 3 or at the hose by a suitable acceleration or pressure sensor 80. The signal 74 can be converted into the frequency domain in the control unit 70 by a fast Fourier transform (FFT), for example. The tuning frequency of the device 1 can be selected by the control unit 70 on the basis of this frequency signal. The tuning frequency of the device 1 can for example also be generated by the control unit 70 (open-loop or closed-loop control apparatus) on the basis of two acceleration or pressure values 74, 75 which are captured by suitable sensors 80, 82 and are converted into the frequency domain in the control unit 70.

Here, the tuning frequency 71 is for example adjusted such that the transmission of the disadvantageous frequency components to be reduced between 80 and 82 is reduced to an optimal extent.

Furthermore, the integration of an actuator system 98 as described above (for example a voice coil actuator or piezo actuator) is possible in all the exemplary embodiments. The actuator system can be supported between the separating means 11 and the housing 13. Additionally or alternatively, the actuator system can be supported between a first separating means portion 11 and a second separating means portions 111; see FIG. 10. The actuator system acts in the movement direction of the separating means 11. As a result, forces can be actively introduced into the fluid. If the actuator system 98 is provided for actively introducing forces into the fluid, these can additionally be used to reduce vibrations in the fluid. This actuator system can be actuated by the control unit 70 by means of suitable power electronics. The actuating signal 97 can be calculated based on a transform of the acceleration and pressure values 74 by a carrier frequency method having quadrature mixing. Here, the carrier frequency corresponds to an order of the speed signal. The tuning frequency can then be ascertained by comparing the phase position between the dynamic pressure variations on the line 3 and the phase position of the membrane deflection. The actuator system 98 can also be actuated via a closed-loop control apparatus implemented in the control unit 70. With periodic pressure excitation, for example by means of a plurality of harmonics of the speed, the actuator system can likewise be actuated via adaptive counter-control (e.g. FxLMS). Here, the sensors 80, 82 can optionally be used for implementing a wave separation method, which makes it possible to differentiate between the incident and reflected wave front in the line 3 or hose. It is likewise possible to actuate the actuator system 98 by means of state feedback or output feedback, it being possible to adjust the coupled dynamic behavior of the line/hose system using the device 1 by means of closed-loop control technology.

Figure 12:
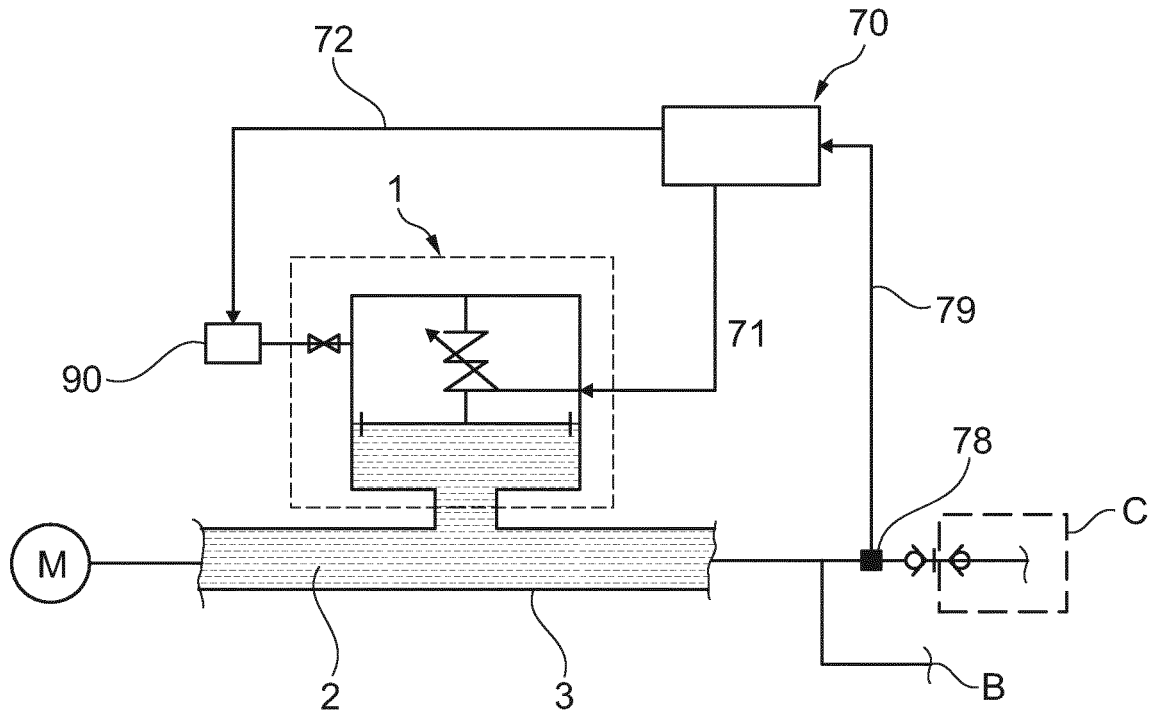
FIG. 12 shows another fluid system comprising the proposed device.

FIG. 12 is a schematic view of a hydraulic system comprising the proposed device 1, there being the option of coupling a further hydraulic component C to the fluid system. The device 1 is arranged in a hydraulic system (not shown in full) which contains a pump A and further components B. Furthermore, the system contains at least one coupling or terminal, which makes it possible to connect the further hydraulic component C or further hydraulic systems. By connecting the further component C or the further system, the dynamic properties of the entire hydraulic system are changed. The hydraulic system contains a coupling sensor 78, which identifies the connection of the further component C and relays this information 79 to the control unit 70. Said control unit can provide actuating signals 71, 72 to the device 1 on this basis in order to change its tuning frequency and/or adapt the pressure in the volume 14, for example using the pump 90. This makes it possible to detune the hydraulic system and to prevent unfavorable combinations of natural frequencies which can arise when a hydraulic system is coupled to a further hydraulic system C. This may for example occur if working equipment is coupled to agricultural machines such as tractors.

Features of the various embodiments that are only disclosed in the exemplary embodiments can be combined with one another and claimed separately.

The invention claimed is:

1. A device for reducing vibrations in a hydraulic system, comprising: a separating device which has a side for delimiting a fluid-conducting cavity of a fluid system, characterized by a vibration-influencing unit, which is designed to mechanically adjust the rigidity of the separating device such that vibrations in the fluid system are reduced, wherein the vibration-influencing unit is designed to adjust the rigidity of the separating device by a rotational movement.

2. The device according to claim 1, wherein the vibration-influencing unit comprises a solid-body spring element.

3. The device according to claim 1, wherein the separating device is mounted so as to be translationally movable.

4. The device according to claim 3, wherein a spring, which presses on a side of the separating device facing away from the fluid-conducting cavity and/or facing the fluid-conducting cavity such that a static pressure in the fluid conducting cavity is compensated for by deforming the spring and displacing the separating device.

5. The device according to claim 1, wherein the separating device separates the fluid-conducting cavity from a second cavity, wherein a static pressure in the fluid-conducting cavity is compensated for by adjusting the gas pressure in the second cavity.

6. The device according to claim 5, further comprising a second separating device, which is translationally displaceable and separates the second cavity from a third cavity, the third cavity being in a fluid connection to the fluid-conducting cavity.

7. The device according to claim 1, wherein the fluid-conducting cavity concentrically surrounds a line of the fluid system.

8. The device according to claim 1, wherein the vibration-influencing unit comprises a spring washer and a connector retainer mounted so as to be rotatable relative to the spring washer, the spring washer being in contact with the separating device via connectors connected to the spring washer in a stationary manner and the connector retainer being in contact with the spring washer via connectors connected to the connector retainer in a stationary manner.

9. The device according to claim 8, further comprising a housing, the connector retainer being rotatable relative to the housing, and characterized by a motor, which is designed to bring about a rotation of the connector retainer relative to the housing.

10. The device according to claim 8, wherein the separating device comprises a translationally displaceable first separating device portion and a translationally displaceable second separating device portion, the second separating device portion being translationally displaceable relative to the first separating device portion and a seal being formed between the first and the second separating device portion, the vibration-influencing unit being connected to the first separating device portion and the second separating device portion such that the vibration-influencing unit takes effect between the first separating device portion and the second separating device portion and is translationally displaceable together with the first separating device portion and the second separating device portion, a sealing region between the separating device and the housing having an adjustable, breakaway torque.

11. The device according to claim 1, further comprising an actuator system (98) which is connected to the separating device and is designed to bring about vibration of the separating device.

12. The device according to claim 1, further comprising a control unit, which is connected to the vibration-influencing unit for adjusting the rigidity such that the rigidity can be adjusted by the control unit, the control unit being designed to adjust the rigidity on the basis of acceleration sensor signals and/or pressure sensor signals and/or a pump speed.

13. The device according to claim 1, further comprising a coupling sensor, which is designed to detect a further component being coupled to the fluid system, a control apparatus being provided and designed to adjust the rigidity on the basis of a signal from the coupling sensor.

14. A method for reducing vibrations in a hydraulic system, comprising:

providing a device according to claim 13, and adjusting the rigidity of the separating device via the vibration-influencing unit such that vibrations in the fluid system are reduced.

15. The method according to claim 14, wherein the rigidity of the separating device is adjusted on the basis of the signal from the coupling sensor.

16. A device for reducing vibrations in a hydraulic system, comprising:

a separating device which has a side for delimiting a fluid-conducting cavity of a fluid system, characterized by a vibration-influencing unit, which is designed to mechanically adjust the rigidity of the separating device such that vibrations in the fluid system are reduced, wherein the separating device separates the fluid-conducting cavity from a second cavity, wherein a static pressure in the fluid-conducting cavity is compensated for by adjusting the gas pressure in the second cavity, and a second separating device, which is translationally displaceable and separates the second cavity from a third cavity, the third cavity being in a fluid connection to the fluid-conducting cavity.

17. A device for reducing vibrations in a hydraulic system, comprising:

a separating device which has a side for delimiting a fluid-conducting cavity of a fluid system, characterized by a vibration-influencing unit, which is designed to mechanically adjust the rigidity of the separating device such that vibrations in the fluid system are reduced, wherein the vibration-influencing unit comprises a spring washer and a connector retainer mounted so as to be rotatable relative to the spring washer, the spring washer being in contact with the separating device via connectors connected to the spring washer in a stationary manner and the connector retainer being in contact with the spring washer via connectors connected to the connector retainer in a stationary manner.

* * * * *